United States Patent
Leipoldt

(10) Patent No.: US 8,617,389 B2
(45) Date of Patent: Dec. 31, 2013

(54) DEVICE FOR FILTERING THE LIQUID PROCESSING MEDIUM USED IN SHAPING OPERATIONS PERFORMED BY CUTTING

(76) Inventor: Matthias Leipoldt, Treuen (DE)

( * ) Notice: Subject to any disclaimer, the term of this patent is extended or adjusted under 35 U.S.C. 154(b) by 528 days.

(21) Appl. No.: 13/024,341

(22) Filed: Feb. 10, 2011

(65) Prior Publication Data

US 2011/0192772 A1    Aug. 11, 2011

(30) Foreign Application Priority Data

Feb. 10, 2010 (DE) .................. 10 2010 007 803

(51) Int. Cl.
*B01D 29/52* (2006.01)
*B01D 29/66* (2006.01)
*B01D 29/72* (2006.01)

(52) U.S. Cl.
USPC ..... 210/86; 210/167.13; 210/332; 210/333.1; 210/408

(58) Field of Classification Search
USPC .......... 210/167.31, 86, 171, 332, 333.01, 210/333.1, 770, 408, 108
See application file for complete search history.

(56) References Cited

U.S. PATENT DOCUMENTS 4,526,688 A * 7/1985 Schmidt et al. ............ 210/323.2
2006/0070962 A1 * 4/2006 Mizuno ........................ 210/777

FOREIGN PATENT DOCUMENTS

DE         7601269 U1 *  2/1977
DE     102006018725 A1   10/2007

* cited by examiner

*Primary Examiner* — Terry Cecil
(74) *Attorney, Agent, or Firm* — Gudrun E. Huckett

(57) ABSTRACT

A device for filtering a liquid processing medium used in cutting has an intake and first filter cells with inlet, filter element, and outlet. The filter elements can be back-flushed. A disposal container as well as a suction conveying device are provided. For filtering, the intake is connected by first valves with first filter cell inlets and first filter cell outlets are connected to a discharge. For back-flushing, inlets of the first filter cells are connected through the first or a further valve to the disposal container. A second filter cell with filter element for contaminated processing medium of the disposal container is disposed above or inside the disposal container. The second filter cell, for filtering, is connected by the suction conveying device to the discharge. A cleaning device for the second filter cell is provided so that waste products removed during cleaning pass directly into the disposal container.

14 Claims, 2 Drawing Sheets

DEVICE FOR FILTERING THE LIQUID PROCESSING MEDIUM USED IN SHAPING OPERATIONS PERFORMED BY CUTTING

BACKGROUND OF THE INVENTION

The invention relates to devices for filtering the liquid processing medium used in shaping operations performed by cutting.

DE 10 2006 018 725 A1 discloses an apparatus for filtering cooling medium or processing medium for cutting, grinding and eroding processes. This apparatus is comprised of a combination of a device of at least two filter cells that, by means of a multi-way valve, are connected to a container for the medium to be cleaned or filtered as well as a container for the contaminated medium contaminated by the back-flush process of the filter cells and by means of a connecting line to the container for the filtered medium, and a drum filter unit connected to the container. Moreover, for achieving flow through the apparatus, at least one pump is provided that is arranged between container and filter cells. Waste produced in this device is a mixture of solid waste products and liquid components of the medium which must be discharged and subsequently disposed of in a complex way.

SUMMARY OF THE INVENTION

It is an object of the present invention to separate the liquid processing medium that is used in cutting, grinding and eroding processes in a simple way from solid components so that the purified or filtered processing medium can be reused in the respective machining process.

In accordance with the present invention, this is achieved in that the device for filtering the liquid processing medium that is used in shaping operations performed by cutting comprises:

first filter cells with filter elements that can be back-flushed wherein, for the filtering action, the intake for contaminated processing medium is connected by means of first valves with the inlets of the first filter cells and the outlets of the first filter cells are connected with the discharge for the purified processing medium or, for a back-flushing action, at least one inlet of a first filter cell is connected by means of either the first valve or a further valve to a disposal container and not with the intake of the contaminated processing medium;

at least one second filter cell for contaminated processing medium of the disposal container that is disposed above or at least partially within the disposal container, wherein, for filtering, the second filter cell is connected through a suction and/or conveying device with the discharge for the purified processing medium; and a cleaning device for the second filter cell, wherein the waste products removed during a cleaning action pass directly from the at least one filter element into the disposal container.

The devices for filtering the processing medium that is used for shaping operations performed by cutting (i.e., a machining process that removes material from the workpiece) are characterized in particular in that the liquid processing medium that is used e.g. for cutting, grinding and eroding processes can be separated in a simple way from the solid components so that the purified processing medium can be reused again.

For this purpose, for the filtering action, the intake for contaminated processing medium is connected by means of first valves with inlets of first filter cells with filter elements that can be back-flushed and the outlets of the first filter cells are connected to the discharge for purified processing medium. For the back-flushing operation, at least one inlet of a first filter cell is connected either by the first valve or a further valve with a disposal container and not with the intake for contaminated processing medium.

Moreover, at least one second filter cell for contaminated processing medium of the disposal container is disposed above or at least partially inside this disposal container, wherein, for the filtering action, the second filter cell is connected by a vacuum (suction) device and/or conveying device to the discharge for purified processing medium. Moreover, a cleaning device for the second filter cell is provided and disposed such that the waste products removed during cleaning can pass directly from the at least one filter element of the second filter cell into the disposal-container.

The device is comprised substantially of the first filter cells, the at least one second filter cell, the cleaning device for the second filter cell, the disposal container, valves and conduits (pipelines) for the individual connections. On the one hand, a compact device is provided in this way that by means of selecting an appropriate number of filter cells can be adjusted easily to the quantity of contaminated processing medium generated in a machining process.

The first filter cells can be back-flushed so that a long maintenance-free service life of the device is ensured. It is beneficial that for this purpose the processing medium that has been purified or filtered upstream in first filter cells is used so that containers for intermediate storage of the processing medium for back-flushing are not required.

Moreover, by means of valves and further pipelines or conduits, buffers can be integrated into the device or can be connected to the device. In this way, a universally employable device is made available.

An advantageous buffer is, for example, a container connected to the intake of the device as a collecting container for contaminated processing medium, which collecting container is directly disposed and connected downstream of the respective machine tools. In this way, back-flushed processing medium can be conveyed into this container or contaminated processing medium can be conveyed for purification also into the second filter cell(s).

The second filter cell(s) and the suction (vacuum) and/or conveying device connected thereto ensure advantageously that substantially only the solid components in the form of the cuttings generated during machining are contained in the disposal container. In this connection, the settling action of the solid components in the disposal container is used. The solid components that are thus present in compact form in the disposal container can thus be supplied to an economical recycling process.

Advantageous embodiments of the invention are disclosed in the dependent claims.

According to a further embodiment of the invention, at least one conveying device is arranged between the intake for contaminated processing medium and the first valves. With this conveying device (e.g. pump) advantageously the contaminated processing medium is conveying through the first filter cells and filtered processing medium is conveyed for back-flushing of individual first filter cells.

Between the outlets of the first filter cells and the discharge for purified processing medium, according to another embodiment of the invention, at least one second valve is arranged. By means of the second valve the pressure conditions of the processing medium purified by the first filter cells can be affected. This is in particular advantageous during back-flushing of the first filter cells.

The filter elements employed in the inventive device, according to another embodiment of the present invention, are advantageously in the form of paper filter elements embodied as cartridges.

The outer circumference of the filter element of the second filter cell according to another embodiment of the present invention is open in the direction of the disposal container so as to provide an inlet. Furthermore, the interior in the direction of the disposal container is closed and in the opposite direction has at least one outlet. In this way, liquid processing medium contained in the disposal container can be easily removed by suction and can be purified by means of the second filter cell. A further advantage resides in that during cleaning the solid waste products that fall off the second filter cell can directly pass into the disposal container and can therefore settle or deposit therein.

The filter element of the second filter cell is comprised according to another embodiment of the present invention of two parts that are stacked atop each other wherein through the lower part and the suction (vacuum) and/or conveying device the liquid component that is located above the solid waste products is removed from the container. While this is done, the disposal container is not supplied with any back-flushed processing medium from the first filter cells.

The cleaning device for the second filter cell, according to another embodiment of the present invention, is advantageously a coupled vibration motor and/or a device for producing compressed air that is connected to the interior of the second filter cell. When using the vibration motor, the second filter cell is arranged springily relative to the disposal container. Such vibration motors have, for example, piezo-elements wherein the indirect piezo-electric effect is used for generating the vibrations, or they have a rotary drive with an eccentric.

The circumference of the upper part of the filter element of the second filter cell, according to another embodiment of the present invention, is surrounded by a vacuum jacket or enclosure positioned at a spacing relative to the filter element.

According to another embodiment of the present invention, a filling level sensor for the deposited solid components of the waste products in the disposal container is arranged such that:

upon reaching the filling level the connection to the first filter cells is interrupted by means of a valve;

the residual liquid component is conveyed through the second filter cell and the suction (vacuum) and/or conveying device to the discharge for purified processing medium; and at least the uppermost layer of the solid component in the disposal container is dried by means of the suction (vacuum) and/or conveying device connected to the second filter cell.

The actuating devices of the valves according to a further embodiment of the present invention are connected to a control unit so that several first filter cells can filter contaminated processing medium and at least one first filter cell can be back-flushed simultaneously by means of filtered processing medium of the remaining first filter cells.

According to another embodiment of the present invention, the second filter cell that is arranged in a springy fashion and the coupled vibration motor are located in an attachment connected to the disposal container. Moreover, in the attachment a sensor for determining the filling level is arranged. The attachment and the disposal container advantageously form together a closed vessel.

According to another embodiment of the present invention, downstream of the first filter cells a buffer container for back-flushed processing medium of the filter elements is arranged. The buffer container may be integrated into the device but it can also be an external container. In the latter case, the buffer container is connected by pipelines or conduits to the device. On or in these pipelines or conduits advantageously valves are integrated so that the buffering container can be connected and disconnected as needed.

DESCRIPTION OF THE PREFERRED EMBODIMENTS

Figure 1:
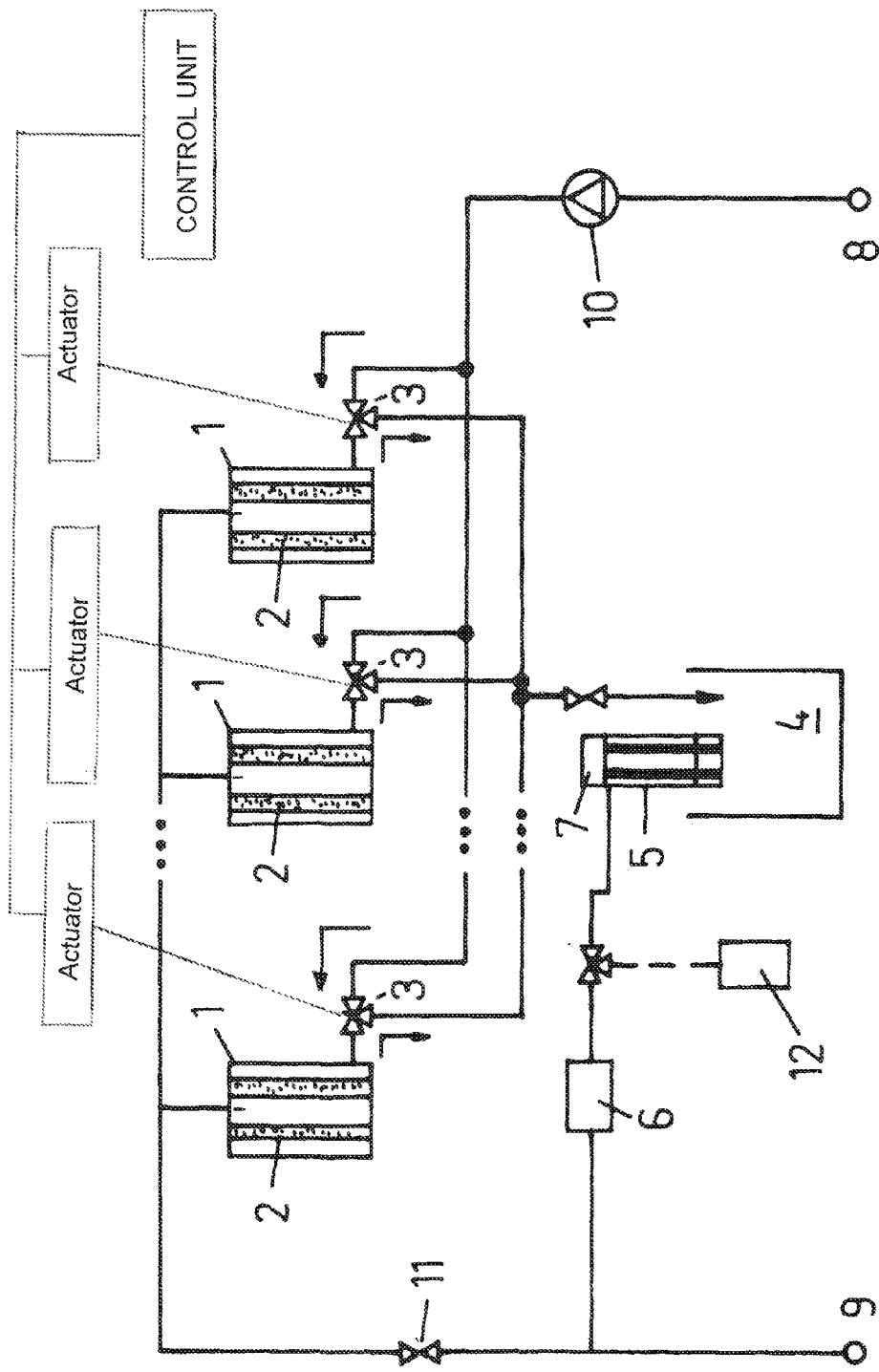
FIG. 1 shows a device for filtering the liquid processing medium used in shaping operations performed by cutting.

A device for filtering the liquid processing medium that is used in shaping operations performed by cutting is comprised substantially of first filter cells 1 with back-flush filter elements 2, first valves 3, a disposal container 4, a second filter cell 5, a vacuum or suction device 6, a cleaning device 7 for the second filter cell, and a first connector as an intake 8 for the contaminated processing medium and a second connector as a discharge 9 for the purified processing medium.

FIG. 1 shows in a basic illustration a device for filtering the liquid processing medium that is used in shaping operations performed by cutting.

For filtering the contaminated processing medium, the intake 8 of the device is connected through first valves 3 with the inlets of the first filter cells 1 and their outlets are connected to the discharge 9 for the processing medium that has been purified through the filter cells 1. The intake 8 and the discharge 9 are well-known connectors for pipe or hose conduits known for this purpose. They may be connected to the machine tools as well as to intermediately positioned buffer containers. For conveying the contaminated processing medium within the device between the intake 8 for the contaminated processing medium and the first valves 3 at least one conveying device in the form of a known pump 10 is arranged.

For back-flushing the first filter cells 1, at least the inlet of a first filter cell 1 is connected through the first valve 3 with the disposal container 4 and not with the intake 8 for contaminated processing medium. The first valve 3 is formed in this connection as a known multi-way valve.

For affecting the pressure conditions in particular during back-flushing operation of the first filter cells 1, between the outlets of these filter cells and the discharge 9 for purified processing medium a second valve 11 is arranged. Instead of or as a supplement to this valve 11, in a first embodiment a conveying device in the form of a pump is provided.

The actuation devices (actuators) of the valves are connected to a control unit so that several first filter cells 1 filter the contaminated processing medium and at least one first filter cell 1 is back-flushed by means of filtered processing medium of the other first filter cells 1. It is understood that the control unit controls also the other valves and components of the device.

The at least one second filter cell 5 is arranged above or at least partially within the disposal container 4. For the filtering action, the second filter cell 5 is connected by means of the suction and/or conveying device 6 with the discharge 9 of the device for the purified processing medium. As a suction and/or conveying device, for example, a known vacuum pump with oil separator is used. Moreover, the second filter cell 5 is coupled to the cleaning device 7. In addition, in one inventive embodiment of a device 12 for generating compressed air is provided and connected by means of a multi-way valve to the second filter cell 5.

The filter elements of the filter cells 1, 5 are paper filter elements in the form of cartridges.

The second filter cell 5 and the cleaning device are positioned in an attachment 13 connected to the disposal container 4.

Figure 2:
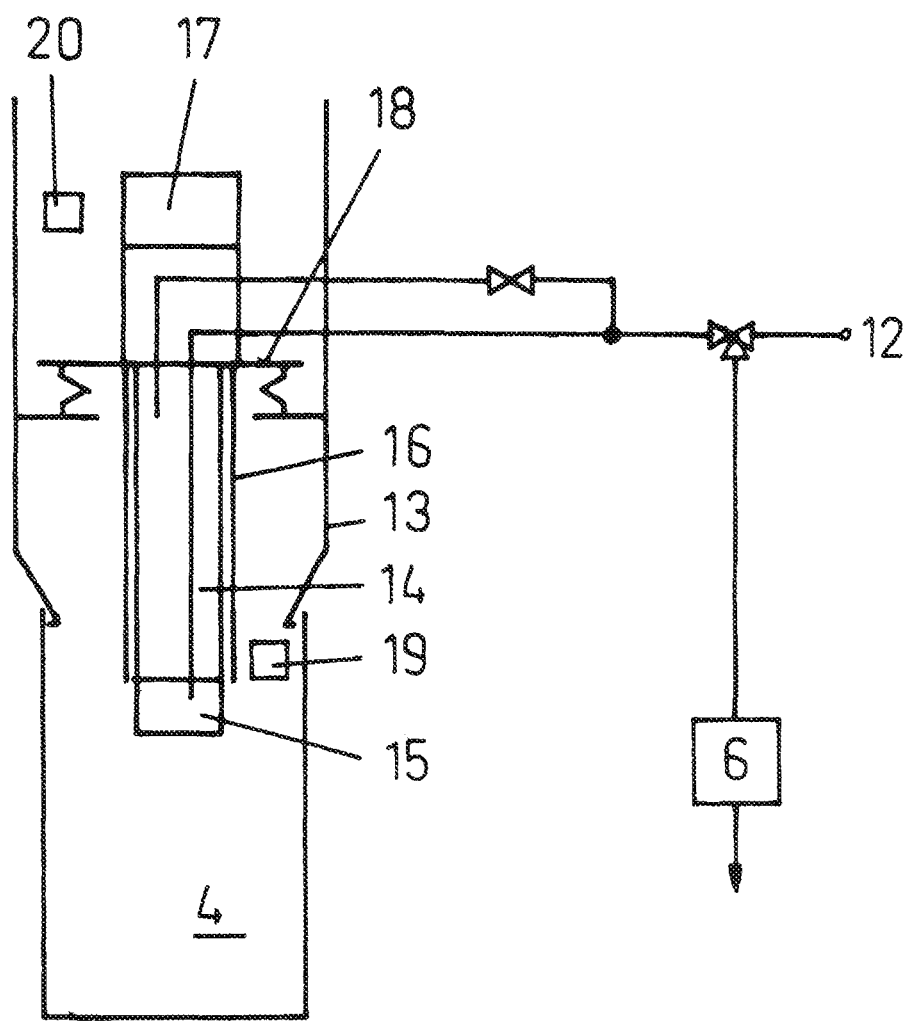
FIG. 2 shows a detail view of the second filter cell disposed above a disposal container.

FIG. 2 shows a second filter cell above a disposal container 4 in a basic illustration.

The disposal container 4 and the attachment 13 are detachably connected to one another so that an empty disposal container 4 can be properly attached and a full one removed. For this purpose, the attachment 13 is coupled to a lifting device. The connection is ensured by means of the weight of the attachment 13 inclusive of its installed components. The filter element of the second filter cell 5 is comprised of two parts 14, 15 stacked atop each other.

The outer circumference of the upper large filter element 14 of the second filter cell 5 is open in the direction of the disposal container 4 so as to provide an inlet. For this purpose, the circumference or periphery of this filter element 14 is surrounded by a suction jacket 16 that is positioned at a spacing to the filter element 14.

The interior of the filter elements 14, 15 is closed in the direction toward the disposal container 4 and in opposite direction has at least one outlet. The cleaning device 7 for the second filter cell 5 is a vibration motor 17 coupled to the second filter cell 5. The vibration motor 17 and the second filter cell 5 including the suction jacket 16, together forming a vibration unit 18, are arranged in a springy fashion in the attachment 13.

In this way, it is ensured that the waste products that have been removed during cleaning pass directly from the filter cell 5 into the disposal container 4.

By means of the large filter element 14 the back-flushed processing medium is substantially filtered. Through the lower smaller filter element 15 the liquid component that is disposed above the solid waste products is removed from the disposal container 4 while the supply of back-flushed processing medium is interrupted.

A filling level sensor 19 for the settled solid components of the waste products is arranged in the disposal container 4 in such a way that:

upon reaching the filling level the connection to the first filter cells 1 is interrupted by means of a valve;

the residual liquid component is conveyed through the second filter cell 5, i.e., the smaller filter element 15 and the suction and/or conveying device 6 to the discharge 9 for the purified processing medium; and at least the uppermost layer of the solid component in the disposal container 4 is dried by means of the suction and/or conveying device 6 connected to the second filter cell 5.

In the attachment 13 there is moreover a sensor 20 for determining the filling level.

In a further embodiment, downstream of the first filter cells 1 a buffering container for back-flushed processing medium of the filter elements is arranged.

The specification incorporates by reference the entire disclosure of German priority document 10 2010 007 803.4 having a filing date of Feb. 10, 2010.

While specific embodiments of the invention have been shown and described in detail to illustrate the inventive principles, it will be understood that the invention may be embodied otherwise without departing from such principles.

What is claimed is:

1. A device for filtering a liquid processing medium used in a shaping operation performed by cutting, the device comprising:

an intake for a contaminated processing medium;

first filter cells each comprising an inlet, a filter element, and an outlet, wherein the filter element is adapted to be back-flushed;

a discharge for purified processing medium;

a disposal container;

a suction and/or conveying device;

wherein, for filtering the contaminated processing medium, the intake is connected with the inlets of the first filter cells by a first valve, respectively, and the outlets of the first filter cells are connected to the discharge for the purified processing medium;

wherein, for back-flushing the filter elements of the first filter cells, at least one of the inlets of the first filter cells is connected either through the first valve or a further valve to the disposal container and not to the intake;

at least one second filter cell comprising a filter element for contaminated processing medium of the disposal container, the at least one second filter cell disposed above or at least partially inside the disposal container;

wherein the at least one second filter cell, for filtering the contaminated processing medium of the disposal container, is connected by the suction and/or conveying device to the discharge for the purified processing medium; and a cleaning device for the at least one second filter cell wherein waste products removed during cleaning pass from a filter element of the at least one second filter cell directly into the disposal container.

2. The device according to claim 1, further comprising at least one conveying device that is arranged between the intake and the first valves.

3. The device according to claim 1, further comprising at least one second valve that is arranged between the outlets of the first filter cells and the discharge for the purified processing medium.

4. The device according to claim 1, wherein the filter elements of the first and second filter cells are in the form of paper filter elements embodied as cartridges.

5. The device according to claim 4, wherein the outer circumference of the filter element of the at least one second filter cell in a direction toward the disposal container is open so as to form an inlet and wherein an interior of the filter element of the at least one second filter cell in the direction of the disposal container is closed and in an opposite direction forms at least one outlet.

6. The device according to claim 5, wherein the filter element of the at least one second filter cell is comprised of two stacked parts wherein the liquid component, disposed above the solid waste products, is removed from the disposal container through the lower part and conveyed by the suction and/or conveying device to the discharge for the purified processing medium.

7. The device according to claim 5, wherein the cleaning device for the at least one second filter cell is a coupled vibration motor.

8. The device according to claim 5, wherein the cleaning device for the at least one second filter cell is a device for generating compressed air that is connected to the interior of the at least one second filter cell.

9. The device according to claim 5, wherein the cleaning device for the at least one second filter cell is a coupled vibration motor and a device for generating compressed air that is connected to the interior of the at least one second filter cell.

10. The device according to claim 5, further comprising a suction jacket that is arranged about a circumference of an upper part of the filter element of the second filter cell and is spaced from the upper part of the filter element.

11. The device according to claim 1, comprising a filling level sensor arranged in the disposal container, wherein the filling level sensor senses a filling level of settled solid components of the waste products separated from the processing medium in the disposal container, wherein upon reaching the filling level the connection to the first filter cells is interrupted by a valve, the residual liquid component of the processing medium is conveyed through the at least one second filter cell and the suction and/or conveying device to the discharge for the purified processing medium, and at least an uppermost layer of the settled solid components in the disposal container is dried by the suction and/or conveying device connected to the at least one second filter cell.

12. The device according to claim 1, comprising a control unit and actuating devices connected to the control unit and acting on the first valves, wherein the control unit controls the actuating devices such that several of the first filter cells filter the contaminated processing medium while at least one of the first filter cells is back-flushed by means of filtered processing medium of said several first filter cells.

13. The device according to claim 1, wherein the at least one second filter cell is arranged springily and the cleaning device is a coupled vibration motor, wherein an attachment is provided on the disposal container and the at least one second filter cell and the coupled vibration motor are disposed in the attachment, wherein in the attachment a sensor for determining the filling level is arranged.

14. The device according to claim 1, wherein downstream of the first filter cells a buffer container for back-flushed processing medium of the filter elements of the first filter cells is arranged.

* * * * *